United States Patent
Ma et al.

(10) Patent No.: US 10,399,532 B2
(45) Date of Patent: Sep. 3, 2019

(54) FIXING DEVICES FOR A CURTAIN AIR BAG IN A VEHICLE

(71) Applicant: Ford Global Technologies LLC, Dearborn, MI (US)

(72) Inventors: Qingsong Ma, Nanjing (CN); Bob Wang, Nanjing (CN); Laurence Yin, Nanjing (CN); Sophie Yan, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 119 days.

(21) Appl. No.: 15/787,458

(22) Filed: Oct. 18, 2017

(65) Prior Publication Data

US 2018/0126943 A1    May 10, 2018

(30) Foreign Application Priority Data

Nov. 9, 2016 (CN) .......................... 2016 1 1035823

(51) Int. Cl.
*B60R 21/213* (2011.01)
*B60R 21/231* (2011.01)
*B60R 21/232* (2011.01)
*B60R 21/215* (2011.01)

(52) U.S. Cl.
CPC .......... *B60R 21/213* (2013.01); *B60R 21/232* (2013.01); *B60R 21/23138* (2013.01); *B60R 21/215* (2013.01)

(58) Field of Classification Search
CPC ............ B60R 21/213; B60R 21/23138; B60R 21/215
See application file for complete search history.

(56) References Cited

U.S. PATENT DOCUMENTS

| 6,082,761 | A  | * | 7/2000  | Kato ..................... B60R 21/213 |
|           |    |   |         | 280/728.2 |
| 7,213,836 | B2 |   | 5/2007  | Coon et al. |
| 7,328,911 | B2 | * | 2/2008  | Chapman ................ B60R 21/20 |
|           |    |   |         | 280/728.2 |
| 7,401,805 | B2 |   | 7/2008  | Coon et al. |
| 7,523,958 | B2 | * | 4/2009  | Jang ..................... B60R 21/213 |
|           |    |   |         | 24/289 |
| 7,621,559 | B2 |   | 11/2009 | Seong |
| 8,172,258 | B2 |   | 5/2012  | Kim et al. |
| 8,585,080 | B2 |   | 11/2013 | Trevena et al. |

(Continued)

FOREIGN PATENT DOCUMENTS

| EP | 2149480 A1   |   | 2/2010 | |
| JP | 2012101595 A | * | 5/2012 | ........... B60R 21/213 |

(Continued)

*Primary Examiner* — Faye M Fleming
(74) *Attorney, Agent, or Firm* — Frank MacKenzie; Kolitch Romano LLP

(57) ABSTRACT

A fixing device for a curtain airbag is provided. The fixing device comprises a bracket extending substantially along a lengthwise direction and configured to receive a portion of folded curtain airbag, a leg connected to and pivotable to the bracket and a joint. The leg is positioned at a predetermined position along a lengthwise direction of the bracket. The joint is located between the bracket and the leg, and configured to break to separate the bracket from the leg when an applied force exceed a predetermined level.

19 Claims, 4 Drawing Sheets

(56) References Cited

U.S. PATENT DOCUMENTS

| | | | |
|---|---|---|---|
| 8,590,922 B2 | 11/2013 | Kim et al. | |
| 8,801,031 B1 * | 8/2014 | Zucal | B60R 21/213 |
| | | | 280/728.3 |
| 9,663,056 B2 * | 5/2017 | Sakurai | B60R 13/0206 |
| 2005/0046154 A1 * | 3/2005 | Rhea | B60R 21/213 |
| | | | 280/728.2 |
| 2005/0087961 A1 * | 4/2005 | Lee | B60R 21/213 |
| | | | 280/728.2 |
| 2006/0138750 A1 | 6/2006 | Park | |
| 2017/0305378 A1 * | 10/2017 | Ma | B60R 22/18 |

FOREIGN PATENT DOCUMENTS

| | | | | |
|---|---|---|---|---|
| JP | 2012101723 A * | 5/2012 | | B60R 21/213 |
| JP | 2018149926 A * | 9/2018 | | B60R 21/215 |

* cited by examiner

US 10,399,532 B2

FIXING DEVICES FOR A CURTAIN AIR BAG IN A VEHICLE

RELATED APPLICATION

This application claims the benefit of Chinese Patent Application No. CN 201611035823.3 filed Nov. 9, 2016, the entire contents thereof being incorporated herein by reference.

FIELD

The present disclosure relates to a fixing device for a curtain airbag in a vehicle.

BACKGROUND

Modern vehicles normally include a plurality of airbags at multiple locations to enhance safety features of the vehicles. For instance, a curtain airbag may be employed and located at a side of vehicle interior along a longitudinal direction of a vehicle. The deployment of the curtain airbag in certain side impact incidents provides an incremental safety benefit by reducing the injury risk to the head and neck portions of occupants. The curtain airbag is normally fixed at a top side of vehicle interior via fixing means, which is required to provide robustness of connection as well as guide the curtain airbag during deployment.

For instance, U.S. Pat. No. 8,590,922 discloses a ramp bracket for a curtain airbag. An open space between a front and a rear is divided into two portions, that is, an upper chamber and a lower chamber by a partition. The front is provided with deployment lines which are cut at regular intervals to break during deployment of the airbag. In another example, U.S. Pat. No. 8,172,258 discloses another ramp with a non-closed cross section.

The inventors of the present disclosure have recognized that manufacturing of ramp brackets and installation can be complicated, and there is a need for an integrated connector and ramp bracket which has simple structure and is easy in manufacturing and installation.

SUMMARY

According to one aspect of the present disclosure, a fixing device for a curtain airbag in a vehicle is provided. The fixing device may comprise a bracket extending substantially along a lengthwise direction and configured to receive a portion of the folded curtain airbag; a leg connected to and pivotable relative to the bracket, and a joint located between the bracket and the leg. The leg is positioned at a predetermined position along a length of the bracket, and the joint is configured to be torn to separate the bracket from the leg when an applied force exceeds a predetermined value. A connection of a distal end of the leg with the bracket secures the curtain airbag in the bracket, and the bracket and the leg and the joint are formed integrally.

In an embodiment, one of the bracket and the leg may comprise an integrally formed metal piece.

In another embodiment, a thickness of the joint may be smaller than a thickness of the bracket and a thickness of the leg.

In yet another embodiment, the leg may comprise a first branch and a second branch spaced apart from the first branch, both first branch and second branch extend in a main plane of the leg. The first and second branches are connected to the bracket via a first joint and a second joint, respectively.

In yet another embodiment, the leg may comprise a protrusion generally extending away from the bracket at an installed position to facilitate a pre-installation of the fixing device.

In yet another embodiment, a connection of the bracket and the leg may form a closed cross section.

In yet another embodiment, the bracket may have a U-shaped cross section and may include a main wall, a first side wall and a second side wall opposed to the first side wall, and a flange extending from and substantially perpendicular to the second side wall. The leg is located at an edge of the first side wall. At an installed position, the main plane of the leg is substantially parallel to the main wall. The flange is positioned corresponding to a location of the joint, and the flange includes a metal piece having an aperture for an insertion of a fastener. The distal end of the leg includes a corresponding aperture. At the installed position, the flange and the distal leg are connected via the fastener.

In yet another embodiment, the bracket and the distal end of the leg may be connected via a snap fit connector.

In yet another embodiment, the leg may have a projection facing the bracket, the flange may have a receiving aperture to receive the projection, and the projection is configured to secure a tail portion of the curtain airbag and connect the leg.

In yet another embodiment, the joint may be located substantially at a top of the bracket and the leg at an installed position, and the joint tears at a deployed position such that the bracket pivots toward an interior of vehicle and conceals a gap between a vehicle body and a trim panel.

According to another aspect of the present disclosure, a curtain airbag assembly for a vehicle is provided. The curtain airbag may comprise an airbag extending along a longitudinal direction of the vehicle and an integrally formed airbag fixing device. The fixing device may comprise a bracket extending substantially along the longitudinal direction of the vehicle; a joint; and a leg connected to and pivotable relative to the bracket via the joint. The leg has a first end distal from the joint. The bracket includes a flange extending away from the joint and along a direction substantially perpendicular to the longitudinal direction. The flange of the bracket and the first end of the leg are connected via a fastener to a sheet metal part of the vehicle body, and the airbag is partially received between the bracket and the leg. The joint has a tearing strength smaller than that of the bracket and the leg.

In another embodiment, the joint may be located at a top of the airbag at the installed position, and the joint tears at the deployed position such that a gap between the sheet metal part and a vehicle body trim part is concealed by the bracket.

In another embodiment, the airbag comprises a flexible tail portion, and the tail portion is connected or sandwiched between the flange of the bracket and the leg.

In another embodiment, one of the bracket and the leg may comprise an integrally formed metal piece, and the metal piece may include an aperture to receive the fastener.

In yet another embodiment, the leg may comprise a protrusion extending away from the bracket at an installed position to facilitate a pre-installation of the curtain airbag fixing device.

According to another aspect of the present disclosure, a curtain airbag fixing device is provided. The fixing device may comprise a bracket having a U-shaped cross section, at least one joint, and at least one leg connected to the joint. The bracket may have a first lengthwise edge and a second lengthwise edge and be configured to receive at least a portion of a folded curtain airbag. The joint is disposed along a segment of the first lengthwise edge of the bracket. The length of the leg is greater than a distance between the first and second lengthwise edges. The bracket is pivotable relative to the leg via the joint, and is separable from the leg at the joint when a force applied to the joint exceeds a predetermined value. A connection of the bracket and the leg may form a substantially closed cross section at a direction substantially perpendicular to the lengthwise direction.

In another embodiment, the bracket, the leg and the joint are formed integrally and a thickness of the joint is smaller than that of the bracket and that of the leg.

In another embodiment, the bracket may comprise a flange extending from the second lengthwise edge and away from the bracket along a direction substantially perpendicular to the second lengthwise edge. The flange may include a metal piece and a through aperture formed on the flange and the metal piece. The first end of the leg distal to the joint may include a fixing aperture corresponding to the through aperture, and the flange and the first end are connected via a fastener at an installed position.

In another embodiment, the flange and the first end of the leg each may include mating projections and receiving apertures, the receiving apertures are aligned with locating apertures on a tail of the curtain airbag such that the curtain airbag is secured to the bracket.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

One or more advantageous features as described herein elsewhere will be readily apparent from the following detailed description of embodiments when taken in connection with the accompanying drawings.

BRIEF DESCRIPTION OF THE DRAWINGS

For complete understanding of one or more embodiments of this invention, reference should be made to the embodiments illustrated in greater detail in the accompanying drawings and described below by way of examples.

Figure 1:
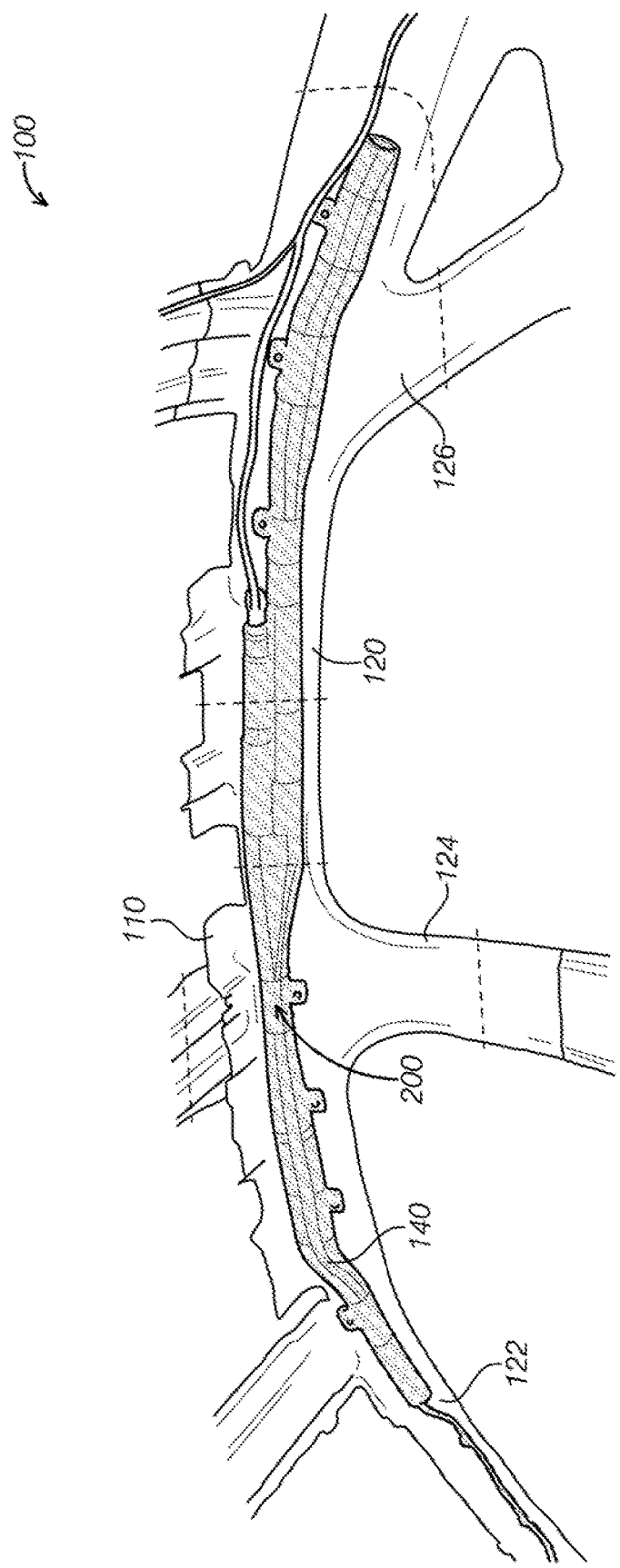
FIG. 1 schematically depicts a vehicle side curtain airbag according to one or more embodiments of the present disclosure.

It should be noted that these figures are intended to illustrate the general characteristics of methods, structures and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

As required, detailed embodiments of the present invention are disclosed herein; however, it should be understood that the disclosed embodiments are merely examples of the invention that may be implemented in various and alternative forms. The figures are not necessarily drawn in scale; some features may be exaggerated or minimized to show details of particular components. As referenced in the figures, the same or similar reference numerals are used to refer to the same or similar components. In the following description, various operating parameters and components are described for different constructed embodiments. These specific parameters and components are included as examples and are not meant to be limiting. Therefore, specific structural and functional details disclosed herein are not to be interpreted as limiting, but merely as a representative basis for teaching one skilled in the art to implement the present invention in various manners.

As mentioned in the background, vehicles are normally equipped with side curtain airbags to protect passengers, especially to protect a head portion of the passengers. There have been various types of connectors to fix the curtain airbag to the vehicle body and various types of ramp bracket to guide the deployment of the airbag. The inventors of the present disclosure have recognized that the connectors and ramp brackets in current technologies might be difficult to be manufactured and assembled in the vehicle. On the other hand, some connectors and ramp brackets having a simple structure might not provide enough strength. Thus, the inventors propose an integrated airbag fixing device at least to address some of the above-mentioned issues.

FIG. 1 illustrates a side airbag or a curtain airbag 140 in a vehicle 100 according to one or more embodiments of the present disclosure. Vehicle 100 includes a roof 110 and a side portion 120 of a vehicle body. The side portion 120 includes pillars extending along a height direction of the vehicle to support the roof 110, such as an A pillar 122, a B pillar 124 and a C pillar 126. A curtain airbag 140 is located between the roof 110 and the side portion 120 and extends along a longitudinal direction L of the vehicle. For clarity, a headliner to cover the roof 110 as well as a trim part to cover the pillar are not shown in FIG. 1. A fixing device 200 may be used to secure the airbag 140 and guide the deployment of the airbag 140. In one or more embodiments, the airbag fixing device 200 is disposed at the B pillar 124 such that the airbag 140 is guided during the deployment to avoid falling between the trim part and the B pillar 124. It should be appreciated that the fixing device 200 may be positioned elsewhere as appropriate, for instance, at the A pillar 122, the C pillar 126 and any other locations as appropriate. The structure and assembly of the curtain airbag fixing device 200 will be discussed in more details with reference to B pillar 124 as an example assembled position.

Figure 2:
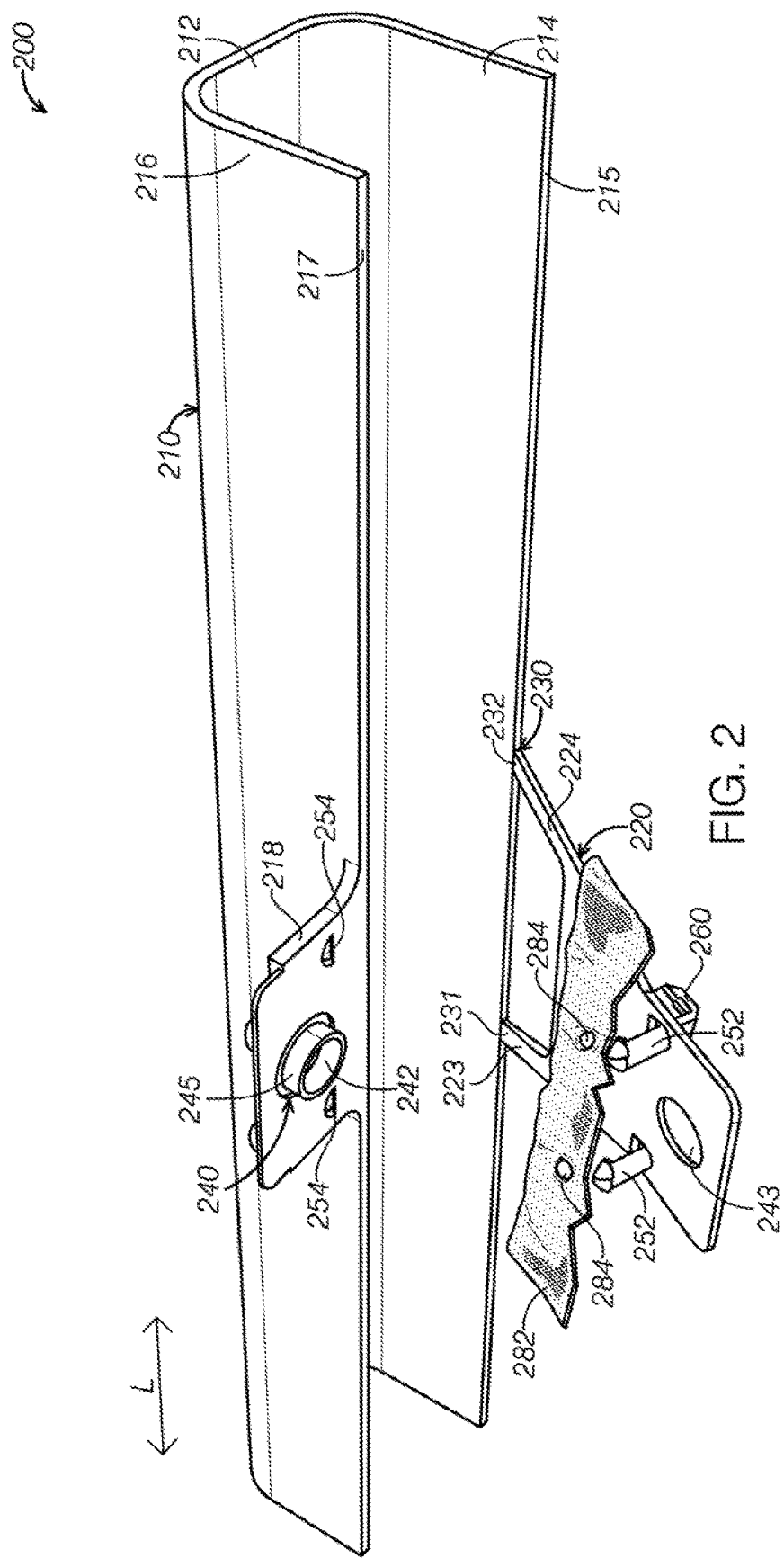
FIG. 2 shows a perspective view of a fixing device for a curtain airbag, illustrating a state where a bracket and a leg of the fixing device are disconnected.
Figure 3:
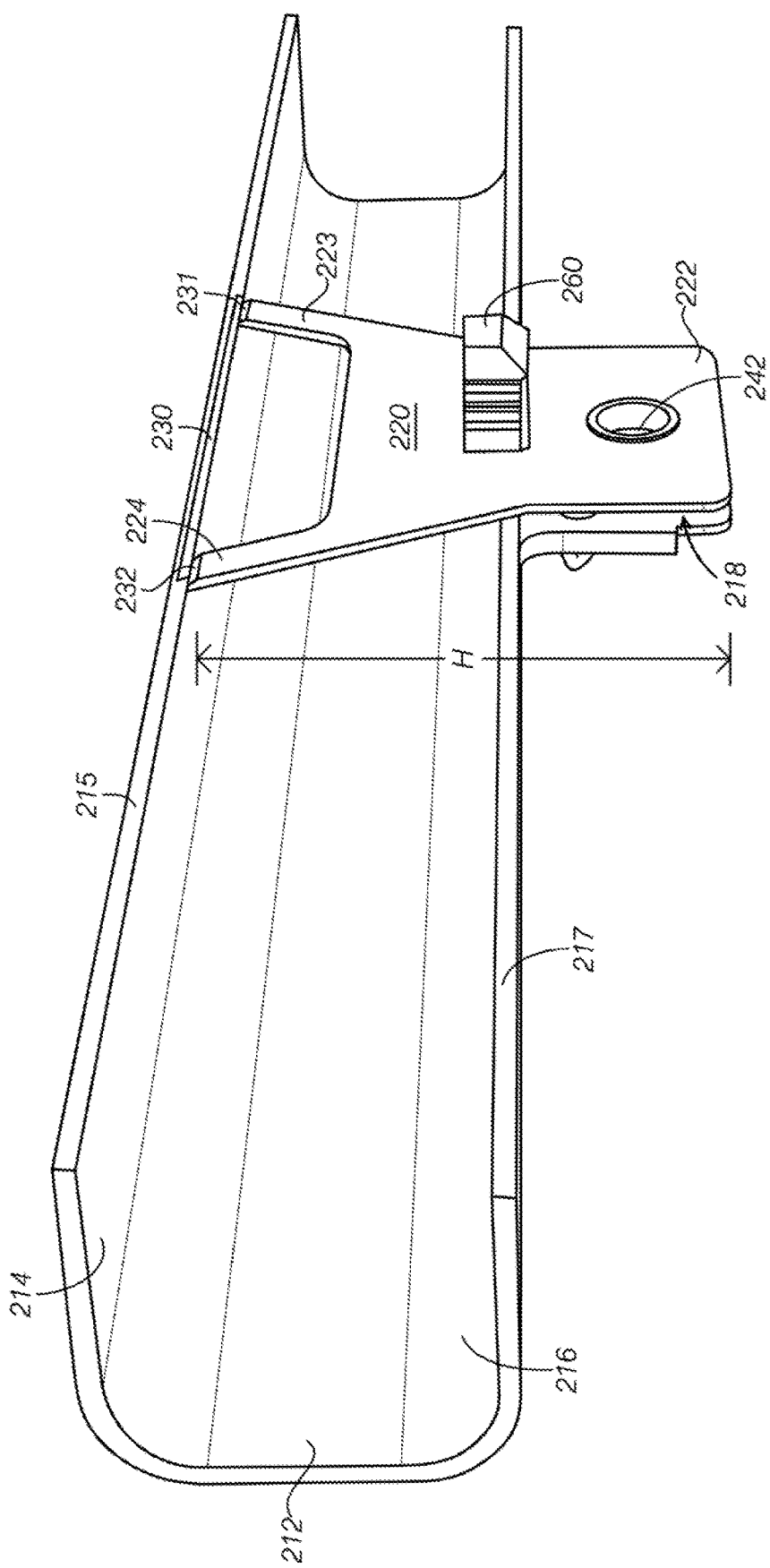
FIG. 3 shows a perspective view of a fixing device for a curtain airbag, illustrating a state where a bracket and a leg of the fixing device are connected.

FIG. 2 is a perspective view of the curtain airbag fixing device 200, illustrating a bracket 210 and a leg 220 of the fixing device 200 at an open state (i.e., these two parts are not connected). FIG. 3 is a perspective view of the fixing device 200, illustrating that the bracket 210 and the leg 220 of the fixing device are connected. In one or more embodiments, as shown in Figures, the fixing device 200 include a bracket 210 extending along a lengthwise direction L, and a leg 220 connected with and is pivotable to the bracket 210.

The term "pivotable" may be interpreted as, when a biasing force is applied to the leg 220 or the bracket 210, the leg 220 and bracket 210 may pivot toward each other or away from each other without any substantial deformation themselves. Such a design may facilitate a pre-installation of the airbag in the bracket 210 without requiring deformation of the bracket 210 or the leg 220. Sufficient strength is required for the bracket 210 or the leg 220. The inventors have recognized that the guiding function of the bracket and leg can be negatively affected (i.e., function to deploy toward a desired direction) if they are too flexible. On the other hand, the installation of the airbag may be difficult if both parts are rigid. The inventors therefore proposed a fixing device with a pivotable joint to address the issue.

In one or more embodiments, as shown in FIG. 2 to FIG. 3, a joint 230 is provided between the bracket 210 and the leg 220, and the joint 230 is breakable at a predetermined force such that the bracket 210 is separable from the leg 220. Pivot between the bracket 210 and the leg 220 may be realized by the joint 230. In other words, the joint 230 may have a smaller tearing strength relative to the leg 220 or the bracket 210. A tearing strength may be designed and tested by any suitable testing means in the art. When an airbag is triggered to deploy, the joint 230 may be torn such that the bracket 210 is separated from the leg 220. The joint 230 may have various configuration. In one embodiment, the joint 230 may have a smaller thickness than that of the bracket 210 and/or that of the leg 220. In another embodiment, the leg 220 may include a first branch 223 and a second branch 224 spaced apart from the first branch 223 and both branches 223, 224 extend in a main plane of the leg 220. The first and second branches 223, 224 are respectively connected to the bracket 210 via a first joint 231 and a second joint 232. In the embodiment shown in FIGS. 2 and 3, the first and second branches 223, 224 are located at edge portions of the leg 220 and opposite to each other. The branches of the leg 220 reduce physical connection portions between the leg 220 and the bracket 210 such that the bracket 210 is separable from the leg 220 while maintaining desired strength at a non-deployed state. It should be appreciated that, the joint 230 may be directly connected with the leg 220, that is, the joint 230 may be a portion of the leg 220 toward the bracket 210 and extends along the longitudinal direction L or a lengthwise direction of the bracket 210. In another embodiment, the joint 230 is connected to two or more branches of the leg 220. In another one or more embodiments, the bracket 210, leg 220 and the joint 230 may be made from plastic, rubber or any other suitable materials and formed integrally. Any appropriate formation techniques may be used, such as an injection molding. Integrated fixing device 200 simplifies the formation process. As the joint 230 is a tearing position for deployment of the airbag, an additional step to form a weakened portion for tearing is avoided.

Further referring to FIG. 2 and FIG. 3, in one or more embodiments, an end 222 of the leg 220 that is distal from the joint 230 may be detachably connected with the bracket 210, such that the curtain airbag may be pre-installed in the bracket 210. The leg 220 and the bracket 210 may be connected and separated via any appropriate connector such as a snap-fit feature. In the example shown in FIG. 2 and FIG. 3, the cross-section of the bracket 210 at a direction perpendicular to the longitudinal direction L is U shaped. In other words, the bracket 210 may have a substantially U shaped cross section. In an example, the bracket 210 includes a main wall 212, a first side wall 214, a second side wall 216 opposing the first side wall 214, and a flange 218 located at the second side wall 216. The leg 220 is connected at an edge of the first side wall 214 corresponding or opposite to the flange 218. In an example, the flange 218 is substantially perpendicular to a surface of the second side wall 216. In another example, a main plane of the leg 220 is substantially parallel to the main wall 212 of the bracket 210 at a fixed position (refer to FIG. 3). In some examples, the leg 220 is positioned a predetermined position along a lengthwise direction L of the bracket 210 and the flange 218 is positioned at a corresponding position of the leg 220 such that the bracket 210 may be connected to the leg 220 via the flange 218. In one or more embodiments, the bracket 210 and the leg 220 form a closed cross section. It should be appreciated that the cross section of the bracket 210 may have an appropriate shape such as a shape including a semicircle.

In another one or more embodiments, regardless of the shape of the cross section, the bracket 210 may have a first lengthwise edge 215 and a second lengthwise edge 217, and the joint 230 is positioned at a segment of the first lengthwise edge 215 of the bracket 210. The flange 218 extends from the second lengthwise edge 217 along a direction away from the second lengthwise edge 217 to connect the leg 220. Referring to FIG. 3, in one or more examples, the flange 218 extends along a direction that is substantially perpendicular to the surface of the second side wall 216, and the leg 220 is substantially parallel to the flange 218 at an installed position, such that the flange 218 and the leg 220 may be overlapped to facilitate connection therebetween at the installed position. As shown in FIG. 2 and FIG. 3, in an example, the length H of the leg 220 is greater than a distance between the first and second lengthwise edges 215, 217, such that the end 222 of the leg 220 may be connected with the flange 218 to connect the bracket 210 and the leg 220.

Again referring to FIG. 2 and FIG. 3, in one or more embodiments, the flange 218 includes a metal piece 240, and the metal piece 240 includes a fixing aperture 242 to receive a fastener. The first end 222 of the leg 220 that is distal from the joint 230 includes a corresponding through aperture 243. At the installed position, the first end 222 and the flange 218 are then connected via a fastener. In one or more examples, the metal piece 240 may have an extended peripheral wall 245 surrounding the fixing aperture 242, and the peripheral wall 245 penetrates through the through aperture 243 on the leg 220. The fixing aperture 242 on the metal piece 240 and the extended peripheral wall 245 may provide a better connection strength. Alternatively, the leg may include a metal piece and the bracket may include a corresponding through aperture. That is, either one of the bracket and the leg may include an integrated metal piece or other piece formed from a high strength material to provide a desired support strength. Referring to FIG. 3, in one or more examples, at the installed position of the airbag, the joint 230 is generally located at a top of the bracket 210 and the leg 220 while the flange 218 is substantially located below the bracket 210. At a deployed position, the joint 230 is torn such that the bracket 210 pivots toward an interior of the vehicle and conceals the gap or clearance between the vehicle body and a trim part. The flange 218 having a strengthening metal piece and/or the leg 220 having a strengthening metal piece may provide more stable connection and strong support. In another embodiment, referring to FIG. 2, the leg 220 includes one or more projections 252 extending from a main body of the leg 220 or facing the flange 218 of the bracket 210 at the installed position. The flange 218 of the bracket 210 includes one or more connection apertures 254 to receive the projection 252. The projection 252 is configured to fix a tail portion 282 of the airbag. And the tail portion 282 of the airbag may be flexible and has one or more positioning apertures 284 corresponding to the projection 252. The projection 252 on the leg 220 passes through the positioning aperture 284 of the airbag and is connected to the connection aperture 254 on the flange 218. That is, the fixing device 200 secures tail portion 282 of the curtain airbag. The projection 252 is configured to be detachably connected with the bracket 210.

In one or more embodiments, the leg 220 includes a protrusion 260 extending away from the bracket 210 at the installed position to facilitate a pre-installation of the curtain airbag fixing device to the sheet metal part on the vehicle body. The sheet metal part may include a pre-installation aperture at an appropriate position. A subassembly of the curtain airbag connected with the fixing device 200 may be pre-installed on the vehicle via the protrusion 260. Subsequently, an operator may further insert a fastener into the fixing aperture 242 and through the aperture 243 to secure the subassembly to the vehicle sheet metal part to complete fastening and installation. The protrusion 260 facilitates the positioning and the pre-installation of the sub-assembly and saves labor and time. Although FIG. 2 and FIG. 3 show one leg, it should be appreciated that the fixing device 200 may include more than one legs along the lengthwise direction L of the fixing device.

Figure 4:
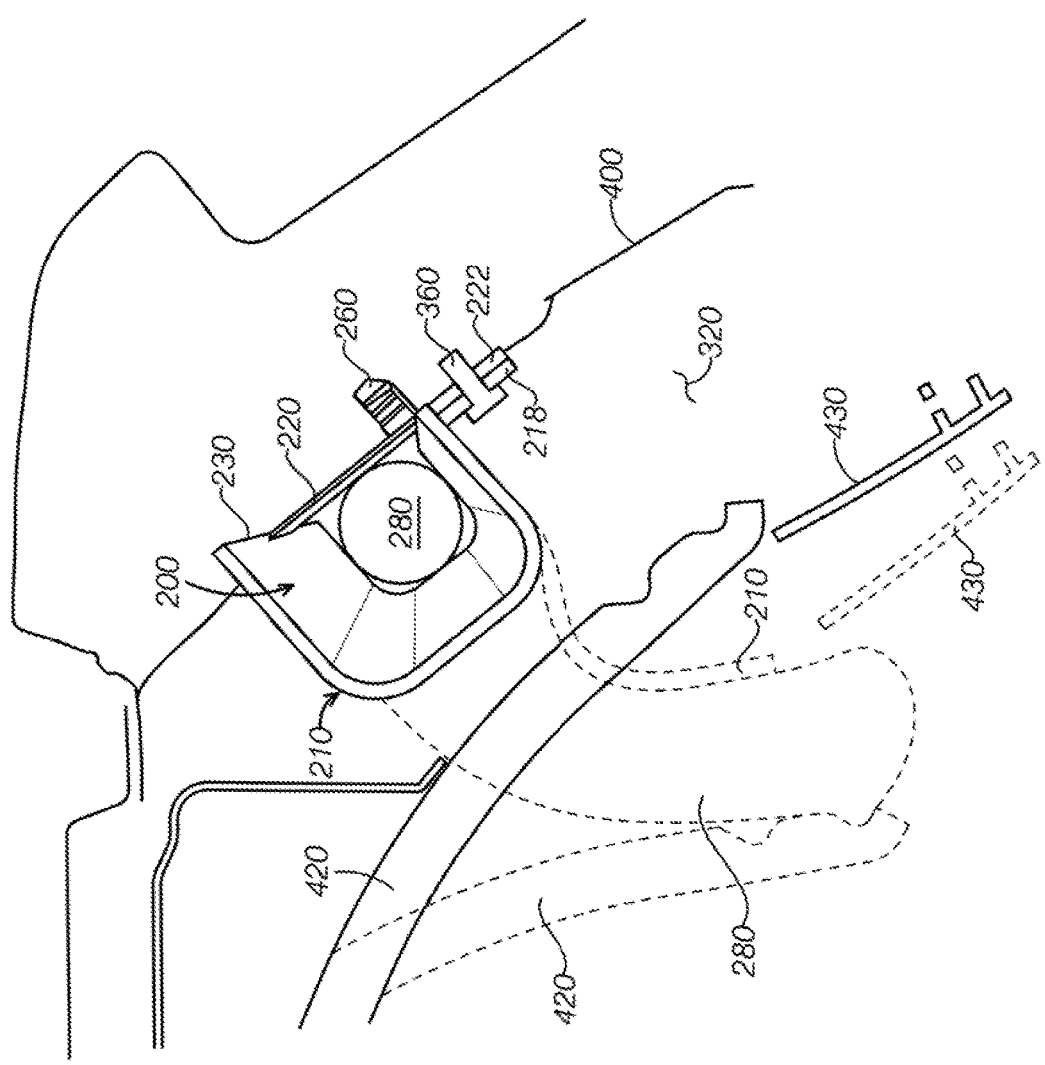
FIG. 4 is a cross-sectional view of a curtain airbag being fixed on the vehicle via a fixing device.

FIG. 4 shows a cross sectional view of a curtain airbag installed to a vehicle via a fixing device according to one or more embodiments of the present disclosure. A solid line represents an installed airbag at a non-deployed state, and a dash line represents the airbag at a deployed state. Referring to FIG. 4 and further in view of FIG. 1 through FIG. 3, in one or more embodiments, the vehicle curtain airbag 280 may be installed into a vehicle via one or more fixing devices 200. The curtain airbag 280 may be positioned around the area between the headliner 420 and the vehicle sheet metal part 400. A trim part 430 is shown in FIG. 4. The curtain airbag 280 may extend along a vehicle's longitudinal direction. In one or more examples, the fixing device 200 includes the bracket 210, the joint 230 and the leg 220 positioned along the longitudinal direction of the vehicle. As mentioned in the description associated with FIGS. 1-3, the longitudinal direction of the vehicle may be the same as the lengthwise direction L of the fixing device 200. The flange 218 of the bracket 210 and the first end 222 of the leg 200 are connected with each other via a fastener 360 and further connected to the vehicle sheet metal part 400. A portion of the folded airbag 280 may be received between the bracket 210 and the leg 220. In one or more examples, the fixing device 200 may be pre-located and pre-installed on the vehicle sheet metal part 400 via the protrusion 260 on the leg 220. In other embodiments, the airbag 280 may include a flexible tail portion having multiple positioning apertures (refer to FIG. 3) such that the tail portion can be secured between the bracket 210 and the leg 220. Specifically, the positioning apertures may correspond to the connecting aperture 254, fixing aperture 242 on the flange 218 of the bracket 210. The protrusion 252 on the leg 220 may be inserted via the positioning apertures on the tail portion and fit in the connecting aperture 254. Meanwhile a fastener such as a bolt 360 is inserted through the fixing aperture 242 of the flange 218, positioning aperture on the tail portion of the airbag and fixing aperture 243 on the leg 220 to connect the airbag 280 to the vehicle. The further connection of the tail portion with the bracket 210 and the leg 220 can avoid or reduce the relative movement along the longitudinal direction L.

Further referring to FIG. 4, in one or more embodiments, at the installed position as shown by the solid line, the joint 230 is located above the airbag 280, while the fastener 360 and the flange 218 are positioned below the airbag 280. At the deployed position shown in dash lines, the joint 230 is torn and the bracket 210 pivots toward an interior trim part 430 and conceals a gap 320 between the vehicle sheet metal part 400 and vehicle interior trim part 430. As aforementioned, the flange 218 may provide strength of support and connection. By positioning a tearing line or a weakened portion with lower tearing strength (i.e. the joint 230) at a pivot connection between the bracket and the leg, a traverse dimension (length) of the bracket 210 after deployment of the bracket substantially equals a peripheral length of a section of the bracket. In this case, the entire peripheral length of the cross section of the bracket could be utilized to the gap 320, thus the bracket 210 may have as smaller a dimension while meeting the packaging requirement.

One or more embodiments of the present disclosure provides optimized fixing devices for the airbag. With an integrally formed airbag fixing device, a manufacturing process can be simplified. Further, the leg and bracket that pivot toward each other may facilitate assembling of the airbag. Furthermore, by having a tearing portion at the joint of the leg and the bracket, an additional step of forming weakened lines/tearing lines is avoided. While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A fixing device for a curtain airbag, comprising:
   a bracket extending substantially along a lengthwise direction of the fixing device, wherein the bracket is configured to receive a portion of the folded curtain airbag;
   a leg connected to and pivotable relative to the bracket, wherein the leg is positioned at a predetermined position at the lengthwise direction,
   a joint, wherein the joint is located between the bracket and the leg and configured to be torn to separate the bracket from the leg when an applied force exceeds a predetermined value;
   wherein a connection of a distal end of the leg with the bracket secures the curtain airbag in the bracket, and wherein the bracket, the leg and the joint are formed integrally.

2. The fixing device of the curtain airbag of claim 1, wherein one of the bracket and the leg comprises an integrally formed metal piece.

3. The fixing device of the curtain airbag of claim 1, wherein a thickness of the joint is smaller than a thickness of the bracket and a thickness of the leg.

4. The fixing device of the curtain airbag of claim 1, wherein the leg comprises a first branch and a second branch spaced from the first branch wherein the first and second branches extend in a main plane of the leg, and wherein the first and second branches are connected to the bracket via a first joint and a second joint, respectively.

5. The fixing device of the curtain airbag of claim 1, wherein the leg comprises a protrusion generally extending away from the bracket at an installed position to facilitate a pre-installation of the fixing device.

6. The fixing device of the curtain airbag of claim 1, wherein the connection of the bracket and the leg forms a closed cross section.

7. The fixing device of the curtain airbag of claim 1, wherein the bracket has a U-shaped cross section and includes a main wall, a first side wall and a second side wall opposed to the first side wall, and a flange extending from and substantially perpendicular to the second side wall, the leg is located at an edge of the first side wall, wherein at an installed position, a main plane of the leg is substantially parallel to the main wall; wherein the flange is positioned corresponding to a location of the joint, and the flange includes a metal piece having an aperture for insertion of a fastener, and the distal end of the leg includes a corresponding aperture; and wherein at the installed position, the flange and the distal leg are connected via the fastener.

8. The fixing device of the curtain airbag of claim 7, wherein the bracket and the distal end of the leg are connected via a snap fit connection.

9. The fixing device of the curtain airbag of claim 7, wherein the leg has a projection facing the bracket, wherein the flange has a receiving aperture to receive the projection, and the projection is configured to secure a tail portion of the curtain airbag and connect the leg.

10. The fixing device of the curtain airbag of claim 7, wherein the joint is located substantially at a top of the bracket and a top of the leg at an installed position, wherein the joint is torn at a deployed position, such that the bracket pivots toward an interior of vehicle and blocks a gap between a vehicle body and a trim part.

11. A curtain airbag assembly for a vehicle, comprising:
    an airbag extends along a longitudinal direction of the vehicle;
    an integrally formed airbag fixing device, wherein the fixing device comprises: a bracket extending substantially along the longitudinal direction of the vehicle, a joint, and a leg connected to and pivotable relative to the bracket via the joint;
    wherein the leg has a first end distal from the joint, and the bracket includes a flange extending away from the joint and along a direction perpendicular to the longitudinal direction, the flange of the bracket and the first end of the leg are connected via a fastener to a sheet metal part of a vehicle body, a portion of airbag is received between the bracket and the leg, and wherein the joint has a tearing strength smaller than those of the bracket and the leg.

12. The curtain airbag assembly of claim 1, wherein the joint is located at a top of the airbag at an installed position, and the joint tears when an applied force exceeds a predetermined value such that a gap between the sheet metal part and a vehicle body trim part concealed by the bracket at a deployed position.

13. The curtain airbag assembly of claim 11, wherein the airbag comprises a flexible tail portion, and the tail portion is connected between the flange of the bracket and the leg.

14. The curtain airbag assembly of claim 11, wherein one of the bracket and the leg comprises an integrally formed metal piece, and wherein the metal piece includes an aperture to receive the fastener.

15. The curtain airbag assembly of claim 11, wherein the leg comprises a protrusion extending away from the bracket at an installed position to facilitate a pre-installation of the curtain airbag fixing device.

16. A curtain airbag fixing device, comprising:
    a bracket having a U-shaped cross section, wherein the bracket has a first lengthwise edge and a second lengthwise edge and is configured to receive at least a portion of a folded curtain airbag;
    at least one joint disposed along a segment of the first lengthwise edge of the bracket;
    at least one leg connected to the joint, and a length of the leg is greater than a distance between the first and second lengthwise edges;
    wherein the bracket is pivotable relative to the leg via the joint, and is separable from the leg at the joint when a force applied to the joint exceeds a predetermined value; and a connection of the bracket and the leg forms a substantially closed cross section at a direction substantially perpendicular to the lengthwise direction.

17. The curtain airbag fixing device of claim 16, wherein the bracket, the leg and the joint are formed integrally and a thickness of the joint is smaller than that of the bracket and that of the leg.

18. The curtain airbag fixing device of claim 16, wherein the bracket comprises a flange extending from the second lengthwise edge and away from the bracket along a direction substantially perpendicular to the second lengthwise edge, wherein the flange includes a metal piece and a through aperture formed on the flange and the metal piece, and the first end of the leg distal to the joint includes a fixing aperture corresponding to the through aperture, and wherein the flange and the first end are connected via a fastener at an installed position.

19. The curtain airbag fixing device of claim 18, wherein the flange and the first end of the leg each include projections and corresponding receiving apertures, the receiving apertures are aligned with locating apertures on a tail portion of the curtain airbag such that the curtain airbag is secured to the bracket.

* * * * *